(12) United States Patent
Tiemann

(10) Patent No.: US 6,971,847 B2
(45) Date of Patent: Dec. 6, 2005

(54) FASTENING SYSTEM

(75) Inventor: Peter Tiemann, Witten (DE)

(73) Assignee: Siemens Aktiengesellschaft, Munich (DE)

( * ) Notice: Subject to any disclaimer, the term of this patent is extended or adjusted under 35 U.S.C. 154(b) by 68 days.

(21) Appl. No.: 10/640,373

(22) Filed: Aug. 14, 2003

(65) Prior Publication Data

US 2004/0109724 A1 Jun. 10, 2004

(30) Foreign Application Priority Data

Aug. 16, 2002 (EP) .................................. 02018487

(51) Int. Cl.⁷ .............................................. F01D 1/00
(52) U.S. Cl. .............................. 415/209.2; 415/209.3; 403/230; 403/348
(58) Field of Search .......................... 415/209.2, 209.3, 415/209.4, 210.1; 403/348, 349, 350, 351, 403/230, 240, 243

(56) References Cited

U.S. PATENT DOCUMENTS

| 1,479,895 | A | * | 1/1924 | Franklin ..................... 416/206 |
| 2,444,758 | A | * | 7/1948 | Stillbach ..................... 403/349 |
| 4,396,352 | A | * | 8/1983 | Pearce ......................... 416/206 |
| 5,074,752 | A | | 12/1991 | Murphy et al. |
| 5,180,284 | A | * | 1/1993 | Monrose et al. ........ 416/204 R |
| 5,244,345 | A | | 9/1993 | Curtis |
| 5,540,552 | A | | 7/1996 | Surdi |
| 6,126,359 | A | * | 10/2000 | Dittrich et al. ............. 403/349 |
| 6,595,754 | B2 | * | 7/2003 | Kuang ..................... 416/210 R |

FOREIGN PATENT DOCUMENTS

| EP | 1143156 | 10/2001 |
| GB | 846623 | 8/1960 |

* cited by examiner

Primary Examiner—Edward K. Look
Assistant Examiner—Igor Kershteyn
(74) Attorney, Agent, or Firm—Harness, Dickey & Pierce, P.L.C.

(57) ABSTRACT

Components must often be released again from their holder for maintenance. Since the fastenings are often very complicated, it takes a considerable amount of time to release them. A fastening system is one where components can be fastened in a rotationally locked manner to a holder, and released again in a simple, reliable and quick manner.

20 Claims, 2 Drawing Sheets

FASTENING SYSTEM

The present application hereby claims priority under 35 U.S.C. §119 on European patent application number EP 02018487.5 filed Aug. 16, 2002, the entire contents of which are hereby incorporated herein by reference.

FIELD OF THE INVENTION

The invention generally relates to a fastening system for a component. In particular, it relates to a fastening system for a turbine guide blade.

BACKGROUND OF THE INVENTION

U.S. Pat. No. 5,540,552 shows a turbine blade which is fastened at two points to a holder. Namely, it is fastened on the rotor of a turbine. A bayonet coupling is used at one point.

U.S. Pat. No. 5,074,752 shows a turbine guide blade which is fastened at both ends, one end having a bayonet coupling. The turbine guide blade cannot be rotated.

U.S. Pat. No. 5,244,345 shows how a safety mat is secured to a disk of a turbine rotor by way of a bayonet coupling.

SUMMARY OF THE INVENTION

An object of an embodiment of the invention is to show a fastening system by which a component can be releasably fastened to a holder in a quick, reliable and simple manner.

An object may be achieved by a fastening system.

BRIEF DESCRIPTION OF THE DRAWINGS

An exemplary embodiment of the invention is shown simplified in drawings.

In the drawings.

DETAILED DESCRIPTION OF THE PREFERRED EMBODIMENTS

Figure 1:
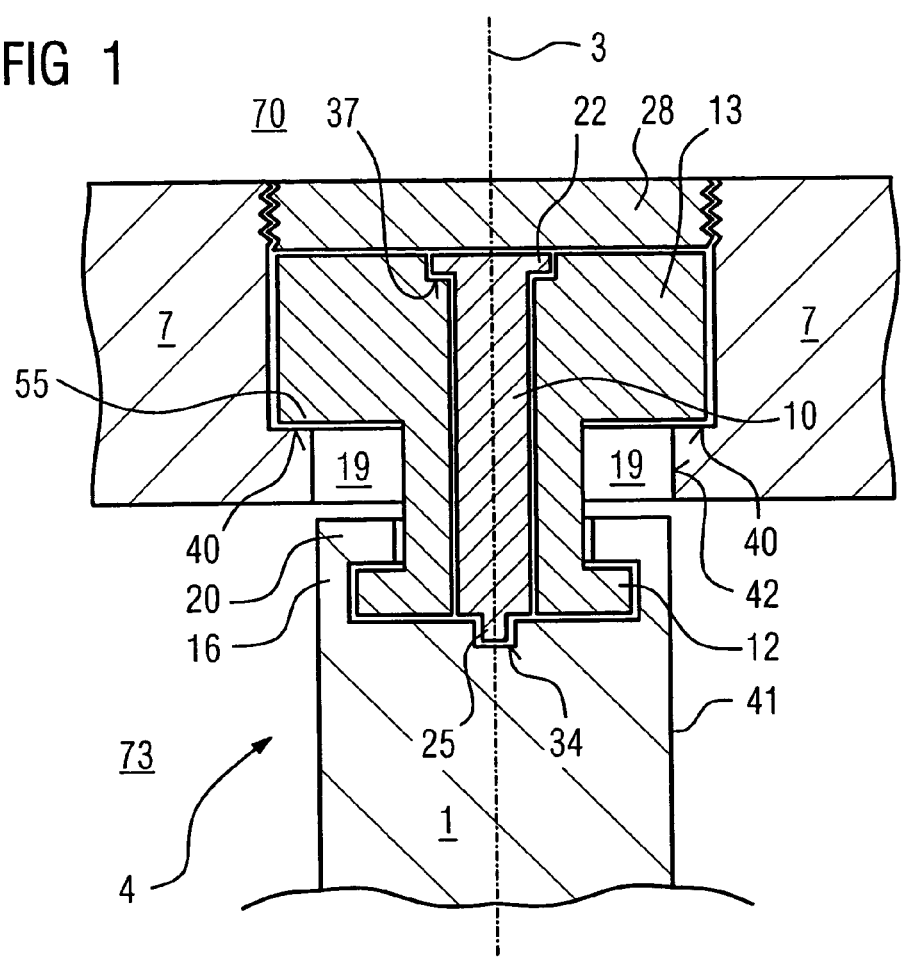
FIG. 1 shows a fastening system according to an embodiment of the invention.

FIG. 1 shows a fastening system 4 according to an embodiment of the invention, having a component 1, in particular a turbine guide blade 1, and a holder 7, to which the component 1 is fastened. The component 1 is fastened to the holder 7, for example, only with the fastening system 4 and extends in a radial direction 3.

The holder 7 is, for example, part of a casing, for example of a turbine, or part of a guide blade carrier. The holder 7 has a continuous opening 19 which extends continuously in radial direction 3 from an outside 70 of the holder 7 to an inside 73 and, for example, is of circular design in cross section perpendicularly to the axis 3.

Figure 2:
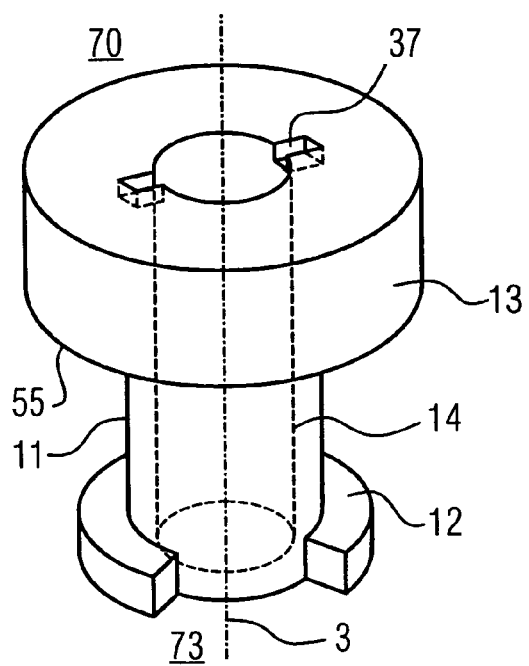
FIG. 2 shows a tube element of a fastening system according to an embodiment of the invention.
Figure 3:
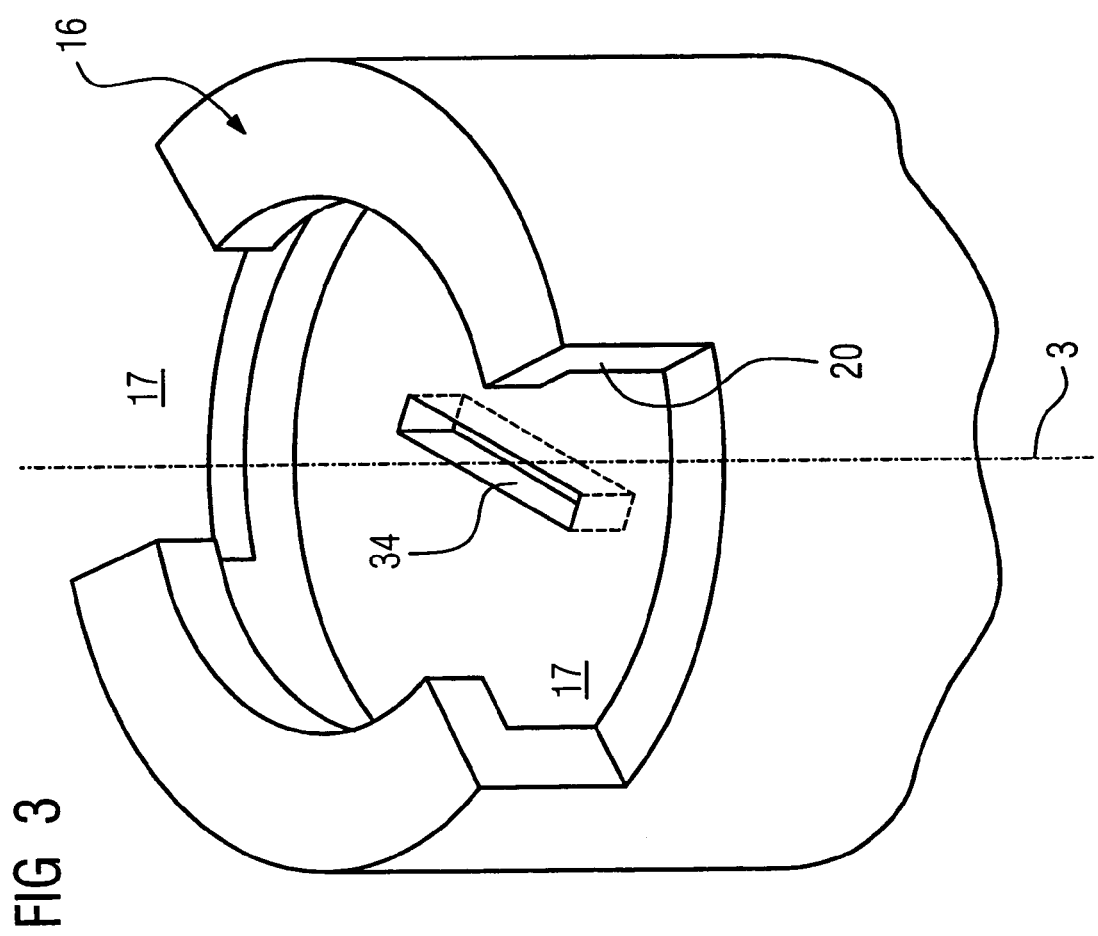
FIG. 3 shows an underside of a turbine blade as a component which is fastened by the fastening system according to an embodiment of the invention.

An intermediate piece 13, for example a tube element 13, is arranged in the continuous opening 19, and a bolt 10 is arranged in the tube element 13. The component 1 is fastened to the tube element 13 by way of a bayonet catch (FIGS. 2, 3). The tube element 13 serves to hold the turbine guide blade 1 in the radial direction 3.

The bolt 10, with its shaped elements—a bolt projection 22 and a bolt lug 25—serves as an anti-rotation locking means for the component 1 relative to the tube element 13. A retaining cap 28, for example a screw 28, on the outside 70 prevents both the bolt 10 and the tube element 13 from being able to move out of the continuous opening 19. The tube element 13 rests with its retaining collar 55, for example inside the continuous opening 19, on a support step 40. Further means of fastening the tube element 13 to the holder 7 are conceivable.

The turbine guide blade 1 can be pushed, for example, from the outside 70 completely through the continuous opening 19; i.e. a maximum cross-sectional area 41 of the component 1 fits in its shape through a minimum cross-sectional area 42 of the continuous opening 19. As viewed in radial direction 3, the continuous opening 19 narrows where the support step 40 is present.

FIG. 2 shows the tube element 13 of FIG. 1. Inside the tube element 13 is an interior space 14 which extends continuously in radial direction 3 and, for example, is of circular design in cross section perpendicularly to the direction 3.

The bolt 10 (FIG. 4) is arranged inside the interior space 14. The bolt 10, with its at least one bolt projection 22 (FIG. 4), comes to bear in a positive-locking manner in a shaped element 37 corresponding to the shaped element 22, for example a receptacle 37, inside the interior space 14 in the vicinity of the outside 70, so that the bolt 10 cannot be rotated relative to the tube element 13. The receptacle 37 is, for example, a notch on an inner surface of the interior space 14. The tube element 13 therefore has a larger inside diameter, for example, in the region of the outside 70 than in the deeper-situated region of the receptacle 37.

In the radial direction 3 as viewed toward the interior space 73 of the turbine, there is a constriction 11 in the outer dimensions, for example in the diameter, of the tube element 13, so that the retaining collar 55 is formed there.

There is then in turn partly a widened portion 12 at its radial end. This widened portion 12 extends in the circumferential direction around the tube element 13. The widened portion 12 is formed in the shape of a ring segment on the tube element 13 and represents the one of two coupling sides of a fastening system 4 (FIG. 1). The widened portions 12 are designed in such a way that the L-shaped steps 20 (FIG. 3) of the component 1 can enclose them.

FIG. 3 shows the underside of the component 1 (e.g. turbine blade), the second coupling side 16 of the fastening system 4 being formed on this underside. On the underside of the component 1, which bears against the holder 7, there is a shaped element 34 corresponding to the shaped element 25, for example a recess 34, in which the correspondingly shaped bolt lug 25 (FIG. 4) engages in a positive-locking manner in such a way that the bolt lug 25 cannot rotate in the receptacle 34.

As viewed in the circumferential direction around the radial axis 3, L-shaped steps 20 are formed on the underside of the component 1. The L-shaped steps 20 have at least one lead-through 17, into which the widened portions 12 of the tube element 13 fit. The L-shaped steps 20 are designed in such a way that the component 1 can be rotated in such a way that the widened portions 12 can be arranged bayonet-like inside the L-shaped steps 20. After it has been appropriately rotated, the turbine blade 1 is held in radial direction 3 by the L-shaped steps 20 and the widened portions 12.

Figure 4:
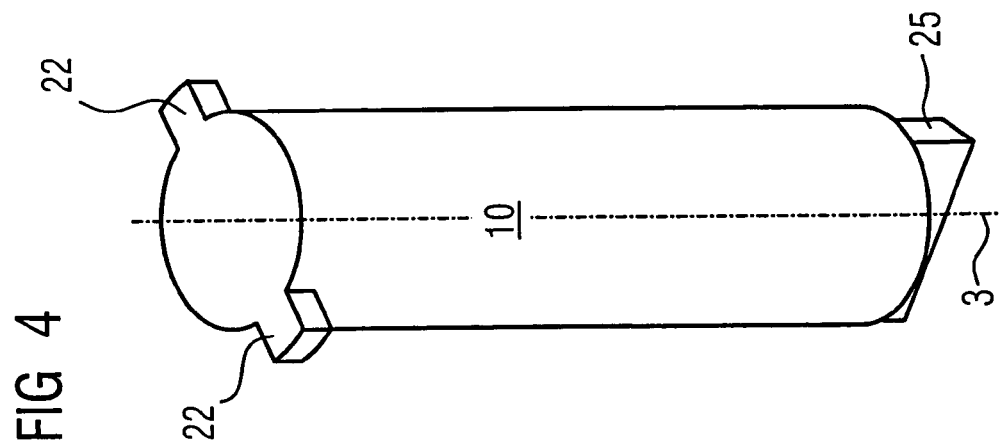
FIG. 4 shows a bolt of a fastening system according to an embodiment of the invention.

FIG. 4 shows the bolt 10, which bears against both the tube element 13 and the component 1 and serves for the anti-rotation locking of component 1 and tube element 13. The tube element 13 is, for example, part of an adjusting device, i.e. the tube element 13 can be rotated about its longitudinal axis disposed in radial direction 3, so that the component 1 can be rotated with it in the same way in order to adjust the component 1, for example the turbine guide blade 1, relative to a flowing medium in a gas turbine. Likewise, however, it is also possible for the tube element 13 to be arranged in a rotationally locked manner inside the holder 7.

The assembly of the turbine blade 1 and the holder 7 with the fastening system 4 is effected, for example, as follows.

The component 1 is pushed from outside 70 through the continuous opening 19 or from inside 73 into the continuous opening 19. The tube element 13 is then likewise pushed into the continuous opening 19 until it bears with the retaining collar 55 against the support step 40, and is then connected to the component 1.

After that, the bolt 10 is inserted into the tube element 13, so that the bolt lug 25 rests in the receptacle 34 of the component 1 and the bolt projection 22 rests in the recess 37 of the tube element 13. However, it is also possible for the elements (1, 10, 13) to already be assembled before being pushed through or into the continuous opening 19. Finally, the screw 28 is fitted.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fastening system for fastening a component to a holder, comprising:
    a bayonet coupling, adapted to hold the component and including two coupling parts which correspond with one another, wherein one of the two coupling parts is formed on the component and wherein the other coupling part is formed on an intermediate piece, the intermediate piece being rotatably mounted on the holder, and wherein the intermediate piece and the component, upon the bayonet coupling being closed, are connected to one another in a rotationally fixed manner by an anti-rotation locking device.

2. The fastening system as claimed in claim 1, wherein the intermediate piece includes a shaped body having a continuous opening, into which a bolt is insertable as the anti-rotation locking device, the bolt including shaped elements which engage in a positive-locking manner in corresponding shaped elements of the intermediate piece and of the component.

3. The fastening system as claimed in claim 2, wherein the bolt, with a bolt lug, engages in a receptacle of the component in a positive-locking manner.

4. The fastening system as claimed in claim 3, wherein the intermediate piece includes a constriction in cross section for forming an outer retaining collar, wherein a continuous opening is provided in the holder, the continuous opening including a cross-sectional reduction for forming a support step, and wherein the intermediate piece rests with its retaining collar on the support step.

5. The fastening system as claimed in claim 4, wherein the intermediate piece is held in the continuous opening of the holder by a retaining cap.

6. The fastening system as claimed in claim 2, wherein the bolt, with a bolt projection, engages in a recess of the intermediate piece.

7. The fastening system as claimed in claim 6, wherein the intermediate piece includes a constriction in cross section for forming an outer retaining collar, wherein a continuous opening is provided in the holder, the continuous opening including a cross-sectional reduction for forming a support step, and wherein the intermediate piece rests with its retaining collar on the support step.

8. The fastening system as claimed in claim 7, wherein the intermediate piece is held in the continuous opening of the holder by a retaining cap.

9. The fastening system as claimed in claim 2, wherein the intermediate piece includes a constriction in cross section for forming an outer retaining collar, wherein a continuous opening is provided in the holder, the continuous opening including a cross-sectional reduction for forming a support step, and wherein the intermediate piece rests with its retaining collar on the support step.

10. The fastening system as claimed in claim 9, wherein the intermediate piece is held in the continuous opening of the holder by a retaining cap.

11. The fastening system as claimed in claim 1, wherein the intermediate piece includes a constriction in cross section for forming an outer retaining collar, wherein a continuous opening is provided in the holder, the continuous opening including a cross-sectional reduction for forming a support step, and wherein the intermediate piece rests with its retaining collar on the support step.

12. The fastening system as claimed in claim 11, wherein the intermediate piece is held in the continuous opening of the holder by a retaining cap.

13. The fastening system as claimed in claim 1, wherein the component is a turbine guide blade.

14. A fastening system for fastening a turbine guide blade to a holder, comprising:
    a bayonet coupling, adapted to hold the turbine guide blade and including two coupling parts which correspond with one another, wherein one of the two coupling parts is formed on the turbine guide blade and wherein the other coupling part is formed on an intermediate piece, the intermediate piece being releasably held in the holder, and wherein the intermediate piece and the turbine guide blade, upon the bayonet coupling being closed, are connected to one another in a rotationally fixed manner by an anti-rotation locking device and are rotatable together in a radial direction.

15. A coupling, for use in fastening a component to a holder, comprising:
    two coupling parts corresponding with one another, wherein one of the two coupling parts is formed on the component and wherein the other coupling part is formed on an intermediate piece, the intermediate piece being releasably held in the holder, and wherein the intermediate piece and the component, upon the coupling being closed, are connected to one another in a rotationally fixed manner.

16. The coupling as claimed in claim 15, wherein the coupling is a bayonet coupling.

17. The coupling as claimed in claim 15, wherein the intermediate piece and the component, upon the coupling being closed, are connected to one another in a rotationally fixed manner by an anti-rotation locking device.

18. The coupling as claimed in claim 15, wherein the intermediate piece includes a shaped body having a continuous opening, into which a bolt is insertable to connect the intermediate piece to the component in a rotationally fixed manner, the bolt including shaped elements which engage in a positive-locking manner in corresponding shaped elements of the intermediate piece and of the component.

19. The coupling as claimed in claim 18, wherein the bolt, with a bolt lug, engages in a receptacle of the component in a positive-locking manner.

20. The coupling as claimed in claim 18, wherein the bolt, with a bolt projection, engages in a recess of the intermediate piece.

* * * * *